United States Patent
Sumpf et al.

(10) Patent No.: US 10,794,766 B2
(45) Date of Patent: Oct. 6, 2020

(54) METHOD AND DEVICE FOR RAMAN SPECTROSCOPY

(71) Applicant: FORSCHUNGSVERBUND BERLIN E.V., Berlin (DE)

(72) Inventors: Bernd Sumpf, Wildau (DE); Martin Maiwald, Berlin (DE)

(73) Assignee: FORSCHUNGSVERBUND BERLIN E.V., Berlin (DE)

( * ) Notice: Subject to any disclaimer, the term of this patent is extended or adjusted under 35 U.S.C. 154(b) by 7 days.

(21) Appl. No.: 16/313,668

(22) PCT Filed: Jun. 23, 2017

(86) PCT No.: PCT/EP2017/065555
§ 371 (c)(1),
(2) Date: Dec. 27, 2018

(87) PCT Pub. No.: WO2018/001900
PCT Pub. Date: Jan. 4, 2018

(65) Prior Publication Data
US 2019/0323891 A1    Oct. 24, 2019

(30) Foreign Application Priority Data
Jun. 27, 2016 (DE) .......... 10 2016 111 747

(51) Int. Cl.
*G01J 3/44* (2006.01)
*G01J 3/10* (2006.01)
*G01N 21/65* (2006.01)

(52) U.S. Cl.
CPC . *G01J 3/44* (2013.01); *G01J 3/10* (2013.01); *G01N 21/65* (2013.01)

(58) Field of Classification Search
CPC ........ G01J 3/44; G01J 3/10; G01J 2003/1213; G01J 3/36; G01J 3/28; G01N 21/65; G01N 21/64
See application file for complete search history.

(56) References Cited

U.S. PATENT DOCUMENTS 5,856,869 A * 1/1999 Cooper ............... G01N 21/65
356/301
5,946,090 A  8/1999 Tashiro et al.
(Continued)

FOREIGN PATENT DOCUMENTS

DE    112004001972    8/2006
DE    112008000655    2/2010
(Continued)

OTHER PUBLICATIONS

Maiwald et al., "Dual-Wavelength Y-Branch Distributed Bragg Reflector Diode Laser at 785 Nanometers for Shifted Excitation Raman Difference Spectroscopy", Appl. Spectrosc. 69, 1144-1151 (2015).

(Continued)

*Primary Examiner* — Abdullahi Nur
(74) *Attorney, Agent, or Firm* — Ray Quinney & Nebeker P.C.; Paul N. Taylor

(57) ABSTRACT

Raman spectroscopy methods and devices are disclosed. The method includes irradiation of excitation radiation onto a sample to be examined. The sample is irradiated with a first excitation radiation of a first excitation wavelength and a different second excitation radiation of a second excitation wavelength. The first excitation radiation scattered by the sample is wavelength-selective filtered by means of a passive filter element. A transmitted filter wavelength of the filter element differs from at least the first excitation wavelength and the second excitation wavelength. A first intensity is determined through a single-channel detector assigned to (Continued)

the filter wavelength from the first excitation radiation scattered and filtered by the sample. Additionally, the filter element wavelength-selective filters the second excitation radiation scattered by the sample. A second intensity is determined through the single-channel detector assigned to the filter wavelength from the second excitation radiation scattered and filtered by the sample.

11 Claims, 12 Drawing Sheets

(56) References Cited

U.S. PATENT DOCUMENTS

| | | | | |
|---|---|---|---|---|
| 8,873,041 | B1* | 10/2014 | Chai | G01N 21/65 356/301 |
| 2005/0007583 | A1 | 1/2005 | Di Foggio | |
| 2008/0030726 | A1 | 2/2008 | Flanders et al. | |
| 2013/0037728 | A1* | 2/2013 | Kiesel | G01N 21/6408 250/459.1 |
| 2016/0123806 | A1 | 5/2016 | Varghese et al. | |

FOREIGN PATENT DOCUMENTS

| | | |
|---|---|---|
| DE | 102010015964 | 9/2011 |
| DE | 202010010932 | 12/2011 |
| DE | 112006000273 | 1/2013 |
| DE | 102012216164 | 3/2014 |
| DE | 112012001802 | 3/2014 |
| DE | 112014000814 | 10/2015 |
| DE | 102014018726 | 6/2016 |
| GB | 1350950 | 4/1974 |
| JP | H0552654 | 3/1993 |
| WO | WO2001/091632 | 12/2001 |

OTHER PUBLICATIONS

Letokhov et al: "Laser spectroscopy", Optics and Laser Technology, Elsevier Science Publishers Bv, Amsterdam, NL, Bd. 10, Nr. 3, Jun. 1, 1978 ( Jun. 1, 1978), Seiten 129-137, XP022605603, ISSN: 0030-3992. DOI: 10.1016/0030-3992(78)90059-2.

Kobayasi T et al: "TEA UV nitrogen laser and its application to high-sensitive remote pulsed-Raman spectroscopy of atmospheric pollutants", IEEE Journal of Quantum Electronics. IEEE Service Center, Piscataway, NJ, USA, Bd. 8, Nr. 6, Jun. 1, 1972 ( Jun. 1, 1972), Seiten 579-580. XP011405077, ISSN: 0018-9197. DOI: 10.1109/JQE.1972.1077135 pp. 579-580.

International Search Report for PCT/EP2017/065555, dated Sep. 19, 2017, 3 pages.

* cited by examiner

METHOD AND DEVICE FOR RAMAN SPECTROSCOPY

CROSS REFERENCE TO RELATED APPLICATIONS

This application is a U.S. Nationalization of PCT Application Number PCT/EP2017/065555, filed on Jun. 23, 2017, which claims priority to German Patent Application No. 10 2016 111 747.1, filed on Jun. 27, 2016, the entireties of which are incorporated herein by reference.

The invention relates to a Raman spectroscopy method and a device. In particular, the present invention relates to a Raman spectroscopy method and device in which a direct, frequency-modulated and narrow-band adjustable diode laser is adjusted to excite a sample over a broad spectral range of excitation wavelengths and whereby the Raman signal of the sample is filtered through at least one narrow-band passive filter element, which is transparent for at least one Raman-displaced excitation wavelength by the sample such that for at least one excitation wavelength, a Raman signal can be recorded through a single-channel detector.

TECHNOLOGICAL BACKGROUND TO THE INVENTION

Due to its suitability for in-situ and online analysis, Raman spectroscopy is increasingly being used in industrial processing and environmental measuring technology. However, one disadvantage is that due to fluorescence and/or their scattering properties, some samples can in practice deliver spectra, the quality of which is impaired by a high subsurface, particularly when work is conducted with measuring times of below 1 s, without sample preparation and/or with compact apparatus.

Typically, excitation radiation of a fixed, but almost random excitation wavelength is coupled into a sample to be examined. Subsequently, the excitation radiation which is inelastically scattered by means of a suitable spectroscopy arrangement is collected and spectrally examined. Depending on the specific material properties of the sample, here, in the recorded spectrum, individual Raman lines are shown which have a spectral distance from the excitation wavelength of the excitation radiation, which is precisely determined and characteristic for the sample. The spectrometer used to record a Raman spectrum must have sufficiently high light sensitivity, alongside a high spectral resolution. Typically, such a spectrometer has a high-resolution grid as a dispersive element and a correspondingly low-noise multi-channel detector, such as a CCD camera that is cooled electronically or via liquid nitrogen, for detection. Corresponding spectrometers are often expensive and are not suitable for the construction of particularly small, compact and robust spectroscopy arrangements.

WO 01/091632 A1 discloses methods and devices for the non-invasive determination of the concentration and verification of substances in body fluids with Raman spectroscopy. The Raman scattering of primary light in a substance to be verified is used in order to obtain a signal that correlates with the concentration of the substance to be verified. In order to eliminate or at least minimise interferences in the measurement of the Raman signal of the substance to be verified, the wavelength spectrum of the secondary light in the range of the Raman spectrum of the substance to be verified is recorded for two different primary light wavelengths.

The object of the present invention is therefore to provide a method and a device for producing and detecting a Raman spectrum which are not based on the known complex spectroscopy structures known from the prior art, can be realised using low-cost components, and are suitable for the construction of particularly small, compact and robust arrangements.

ABSTRACT OF THE INVENTION

These objects are attained according to the invention by the independent patent claims. Preferred designs of the invention are described in the subclaims.

The method according to the invention for Raman spectroscopy of a sample to be examined has the following method steps: irradiation of excitation radiation onto a sample to be examined, whereby the sample to be examined is irradiated with a first excitation radiation of a first excitation wavelength and a second excitation radiation of a second excitation wavelength, whereby at least the first excitation wavelength differs from the second excitation wavelength; wavelength-selective filtering of the first excitation radiation scattered by the sample by means of a passive filter element, whereby a transmitted filter wavelength of the filter element differs from at least the first excitation wavelength and the second excitation wavelength, and whereby through a single-channel detector assigned to the filter wavelength from the first excitation radiation scattered and filtered by the sample, a first intensity is determined; wavelength-selective filtering of the second excitation radiation scattered by the sample by means of the filter element, whereby through the single-channel detector assigned to the filter wavelength from the second excitation radiation scattered and filtered by the sample, a second intensity is determined.

Accordingly, a sample to be examined is first radiated with at least two excitation radiations of differing excitation wavelengths. Here, an excitation radiation is in particular understood to be a monochromatic radiation of a low spectral width with a specific central wavelength as the excitation wavelength. Such excitation radiation can typically be emitted by diode lasers or laser diodes in single-mode operation. Here, central wavelengths of around 785 nm in particular with spectral widths (FWHM) of under 1 nm are particularly preferred. The generation of the different excitation radiations can for example be achieved through the use of several laser diodes with different emission wavelengths as excitation wavelengths. Furthermore, the at least two excitation radiations can also be generated with different excitation wavelengths through a single laser diode that is alterable in terms of its emission wavelength, or by a correspondingly spectrally adjustable diode laser. Here, alongside the spasmodic setting of individual wavelengths that are at a distance from each other (for example at a distance of 1 nm or 2 nm), a continuous adjustment over a certain excitation wavelength range (for example over 5 nm, 10 nm, 15 nm or 20 nm) can be conducted. In the former case, a corresponding discrete Raman spectrum can be generated as a result, while in the second case, a continuous Raman spectrum over a spectral range that corresponds to the range of the respective excitation wavelength range can be generated. With a central wavelength of 785 nm, an excitation wavelength range of 10 nm here corresponds to a measurable wave number range of approximately 160 cm$^{-1}$, wherein the spectral distance of the individual measuring points of this wave number range of the respective excitation radiation with the corresponding excitation wavelength is determined by the filter wavelength of the filter element. Through a corresponding selection of different filter ranges, the spectral width of the Raman spectrum recorded can be expanded almost randomly.

The excitation radiation scattered by the sample is wavelength selectively filtered by means of a passive filter element with a specific transmitted filter wavelength. Here, the passive filter element can preferably be a dichroitic filter, a Bragg filter or a Fabry-Perot filter. The use of a diffractive grid, an etalon or a Mach-Zehnder interferometer is also possible. Here, in particular, wavelength selective filtering is understood as being filtering in which the filter wavelength is transmitted by the filter element with a maximum intensity and the spectral ranges bordering the filter wavelength are suppressed or blocked. Here, the central wavelength of the pass band range (also known as the transmission range or pass band) of the filter element is referred to by the term filter wavelength. With symmetrical band passes, this results from the spectral position of the band pass centre. An alternative determination of the central wavelength of a filter element can also occur via the transmission behaviour in the pass band range. An advantageous determination of a central wavelength can in this case be conducted via the centre of the spectral range, whereby the filter element has a relative transmission of at least 0.9 in relation to its maximum transmission in the pass band range. This definition is particularly suitable for determining the central wavelength of filter elements with non-symmetrical filter range edges. The definition of the width of the pass band range of a filter element can be made through the transmission behaviour. Here, a pass band range of a filter element can be specified as the connected spectral range within which the relative transmission is preferably at least 0.95 in relation to a maximum transmission in the pass band range. Further preferred are connected spectral ranges in which the relative transmission is at least 0.7; at least 0.8; at least 0.9; or at least 0.99. A corresponding definition of the blocking area of a filter element can also be made through the transmission properties of the filter element within this blocking area. A filter element can here be regarded as blocking for a wavelength when, for this wavelength, it has a relative transmission of less than 0.3; of less than 0.2; of less than 0.1; of less than 0.5; or less than 0.01 in relation to the maximum transmission of the filter element in the pass band range of its filter wavelength.

The filter wavelength must according to the invention differ from at least one first excitation wavelength and one second excitation wavelength. However, the filter element can also have several pass band ranges that are separated from each other by stop bands (also known as blocking areas); in this case, at least one of the filter wavelengths must differ from at least the first excitation wavelength and the second excitation wavelength. Here, it is particularly preferred that the central wavelengths of the individual pass band ranges correspond to individual Raman lines of at least one of the excitation radiation scattered by the sample. When a sample generates several characteristic Raman lines when being radiated with excitation radiation of a specific excitation wavelength, it is particularly preferred when the wavelengths of at least some of these Raman lines correspond to the individual filter wavelengths of the filter element with several pass band ranges.

The filter wavelength of the filter element is assigned a detector which determines a first intensity from the first excitation radiation scattered by the sample and filtered by the filter element, and determines a second intensity from the second excitation radiation scattered by the sample and filtered by the filter element. This determination can in particular be achieved in that the different excitation radiations are radiated onto the sample at different times and as a result, corresponding intensity determinations can also be made at different times. When a filter element is used with several pass band ranges, it is however also possible, through a locally displaced radiation of the different excitation radiations onto the sample, to conduct a simultaneous intensity determination for several excitation radiations with one detector which is respectively assigned to the different filter wavelengths. As a result, the precision, sensitivity, and speed in particular of the method presented can be increased. A filter element with several pass band ranges can for example be a filter element with which the individual band pass ranges are assigned to specific positions on its surface. In particular, a grid-shaped arrangement of the individual filter areas is preferred here.

The idea of the present invention is that the spectral partition of a Raman radiation to be evaluated that is usually necessary with Raman spectroscopy is achieved not through an additional spectrometer, but through a spectrally adjustable excitement in combination with a wavelength-selective filtering. Since the Raman effect, unlike continuous fluorescence, is characterised in particular by the sharp Raman lines in its spectrum that occur during the process, conclusions can already be drawn about essential properties of a sample from a discrete spectral analysis. With unknown samples in particular, this also enables conclusions to be drawn about the type of sample, since the Raman spectrum of a sample is characteristic for the sample. A further advantage of the method is its fundamental wavelength independence in relation to the individual excitation wavelengths used to excite the sample. While with a conventional spectrometer, often only a limited spectral range is available for examinations due to the bandwidth of the dispersive element used, with the method according to the invention, through a simple change to the excitation wavelength of the excitation radiation, for example through adjustment of the excitation source or through its replacement, a low-cost and uncomplicated change can be made between different spectral ranges, for example, a change from an optical to a near infrared or far infrared excitation. Since with Raman spectroscopy, the decisive factor is essentially spectral distances and not specific wavelength ranges, as a result, by means of a particularly simple and low-cost exchange of the excitation source or excitation radiation, the spectroscopic window can respectively be individually displaced into a particularly advantageous range for the individual samples to be examined. As a result, interfering physical effects in particular, such as general fluorescence occurrences, atomic and molecular resonances or particular spectral windows, can be taken into account when generating and detecting a Raman spectrum.

Preferably, at least two determined intensities are stored. The number of determined intensities here depends on the number of excitation radiations used. For example, a first excitation radiation of a first excitation wavelength, a second excitation radiation of a second excitation wavelength, and a third excitation radiation of a third excitation wavelength can be radiated onto a sample, whereby all three excitation wavelengths differ from each other. The excitation radiations scattered by the sample can then be filtered by means of a passive filter element with a specific transmitting filter wavelength, whereby this filter wavelength can differ from at least two of the three excitation wavelengths. Subsequently, through a detector assigned to the filter wavelength, one first, second, and third intensity can respectively be determined from the filtered first, second, and third excitation radiation scattered by the sample. This number has no upward limit, so that any number of excitation radiations required can be radiated onto a sample both as a discreet and as a continuous spectrum, and therefore also a corresponding number of intensities can be determined. Equally, a mixture of several discreet and continuous spectra is possible. The individual elements can also at least partially spectrally overlap.

Preferably, conclusions can be drawn about the sample from at least two determined intensities. This can be achieved in particular by the fact that through the passive filter element, a fixed filter wavelength is specified, whereby this filter wavelength differs according to the invention at least from a first excitation wavelength and a second excitation wavelength. It is further preferred that at least these two excitation wavelengths do not fall within the transmission range of the filter element defined by the filter element with the filter wavelength. In other words, at least these two excitation wavelengths lie within a stop band of the filter element and are not transmitted by the filter element. The excitation radiation that is scattered by the sample and filtered is thus spectrally limited to the range of the specified filter wavelength or the spectral width of the corresponding pass band range of the filter element. To this extent, the scattered and filtered excitation radiation is a radiation that has a specified spectral distance to the excitation wavelength of the respective excitation radiation. This spectral distance corresponds to a specific wave number (the inverse of the corresponding wavelength) in the Raman spectrum and can therefore deliver a discreet Raman signal in relation to this first wave number. If a second excitation radiation of a second excitation wavelength, which differs from the first excitation radiation of the first excitation wavelength, is now radiated onto this sample, the spectral distance between the second excitation wavelength and the filter wavelength deviates from the spectral distance between the first excitation wavelength and the filter wavelength. Therefore, this distance corresponds to a further wave number in the Raman spectrum, so that a discreet Raman signal in relation to this second wave number can be determined. Through radiation of a sufficiently high number of different excitation radiations with excitation wavelengths that differ from each other respectively, a complete Raman spectrum can thus be generated both from discreet measurement values and from, at least in part, continuous measurement ranges. In particular, conclusions can be drawn about the sample from at least two determined intensities.

For this purpose, it is particularly preferred that the spectral distance between at least one excitation radiation and a scattered and filtered excitation radiation corresponds to precisely one Raman displacement of the excitation radiation scattered by the sample. Conclusions about the sample can in particular also be drawn when the above condition is only fulfilled for one of the excitation radiations with one excitation wavelength. The intensity determined for this excitation radiation delivers a first indication for a corresponding Raman signal with the detection of the excitation radiation that is scattered by the sample and filtered by the filter element with the filter wavelength. Since for the second excitation radiation in this case, no metrologically significant intensity can be determined for a Raman process, the comparison of both intensities also enables conclusions to be drawn about the sample. A simplified examination of a sample through just two excitation radiations with different excitation wavelengths, i.e. through the generation and detection of a discreet Raman spectrum on two spectral positions, can already be sufficient for an unequivocal sample determination; at least through this, conclusions can be drawn about the type of possible samples. A further opportunity for drawing conclusions about the sample is provided when the above condition is precisely fulfilled for the first and the second excitation radiations, i.e. for both excitation wavelengths. Due to the fact that the two Raman lines being examined in this case are independent of each other, conclusions can also be drawn about the sample when the Raman signals are weak. In order to preclude faulty measurements, a further excitation radiation of a further excitation wavelength should however also be examined in order to be certain, whereby the scattered and filtered excitation radiation of a further excitation wavelength precisely does not correspond to a Raman displacement of the excitation radiation scattered by the sample. In order to draw conclusions about a sample type, it is therefore preferred that the excitation wavelengths of the respective excitation radiations are precisely selected such that from the group of spectral distances between the individual excitation radiations and the corresponding scattered and filtered excitation radiations, at least one distance of a Raman displacement corresponds to an excitation radiation scattered by the sample, and a distance precisely not of a Raman displacement corresponds to the excitation radiation scattered by the sample.

The method according to the invention for generating and detecting a Raman spectrum of a medium to be examined can further have the following method steps: wavelength-selective filtering of at least the first excitation radiation scattered by the sample and the second excitation radiation scattered by the sample by means of at least one further passive filter element, whereby the transmitted filter wavelengths of the individual filter elements differ both from each other and also respectively from the individual excitation wavelengths of the respective excitation radiations; whereby through one respective further single-channel detector assigned to at least one further filter wavelength, excitation radiation scattered by the sample and filtered, at least one first intensity and one second intensity are respectively determined; whereby at least two determined intensities are stored for the at least one further filter wavelength; whereby from at least four determined intensities with at least two filter wavelengths, conclusions are drawn regarding the sample.

The procedure according to the method here largely corresponds to the procedure described further above. The respective information regarding the properties of the excitation sources, excitation radiations, excitation wavelengths, filter elements, filter wavelengths, and their functional connection apply accordingly. However, with this embodiment, a further combination consisting of at least one further filter element and respectively one detector assigned to a specific filter wavelength of this filter element is used. Here, too, there is a determination of intensities with different combinations of excitation and filter wavelengths, whereby from the determined intensities with at least two filter wavelengths, conclusions are drawn about the sample. To this extent, this embodiment corresponds to the alternative realisation of a method with a filter arrangement already described in advance, in which an individual filter element is used with several filter wavelengths and, at least preferred, a corresponding number of detectors which are individually assigned to the individual filter wavelengths. In a similar manner, there is therefore a full or at least partial redesign of said filter arrangement, in which individual filter elements are respectively only assigned precisely one filter wavelength that is of relevance to the method. Conversely, however, it is certainly the case that multiple filter wavelengths that are of relevance to the method can also in this exemplary embodiment additionally be assigned to at least one further filter element that is additionally introduced, in a similar manager to the previous exemplary embodiment.

Preferably, with the method according to the invention, the individual filter ranges of the respective filter elements are combined with each other for at least two filter ranges such that these filter ranges spectrally overlap at least partially. The intensities of a spectrally adjusted excitation source with multiple excitation wavelengths, which are determined by the detectors that are assigned respectively to the individual filter ranges via their respective filter wavelength, whereby for at least one of these excitation radiations, the spectral distance between this excitation radiation and the scattered excitation radiation which is spectrally filtered within the overlap area of said filter areas precisely corresponds to a Raman displacement of the excitation radiation scattered by the sample, are interlinked. This permits a separation of the respective measurement backgrounds from the Raman signal and can be used to increase the signal-noise ratio or for a more precise determination of the spectral position and the intensity of the respectively examined Raman line. In particular, this measurement method also permits the use of spectrally not ideal narrow-band (line or delta form) filter elements and/or excitation sources. Preferably, monochromatic excitation sources and correspondingly narrow-band filter elements are used.

Preferably, the excitation sources are narrow-band, continuously spectral laser diodes that are adjustable over a broad range and directly frequency modulated. Here, narrow-band means that these are laser diodes the emitted radiation of which is limited to a very narrow spectral range. This is particularly the case when they are laser diodes in single-mode operation. Here, typically, line widths of below 1 nm (FWHM) are achieved. Particularly preferred line widths (FWHM) are here below 10 nm, below 5 nm, below 1 nm and below 0.1 nm. Depending on the wavelength range, this corresponds to frequency widths in the lower THz range down to the MHz range. Preferably, excitation radiations with excitation wavelengths in the range of around 785 nm are possible, furthermore excitation wavelengths from the entire near infrared spectral range, the visible spectral range and the ultraviolet, infrared and far infrared spectral range. Further, it is preferred that the laser diodes are adjustable over a broad spectral range. This has the advantage that an excitation source can provide a broad spectrum of possible excitation wavelengths. In particular with continuously adjustable laser diodes, continuous Raman spectra can be generated and recorded with the method according to the invention. In particular, a continuous adjustment through several nanometres is here particularly preferred. Also preferred are laser diodes with which different modes can be excited, so that for example larger, at least discreetly achievable wavelength areas can be achieved at a distance of several 10 nm. Further preferred are directly frequency-modulated laser diodes, with which a change in wavelength can be set by means of intrinsic diode parameters, for example through a temperature or a current. Preferably, so-called dual wavelength diode lasers, for example a Y-branched dual wavelength DBR diode laser [Maiwald et al., "Dual-Wavelength Y-Branch Distributed Bragg Reflector Diode Laser at 785 Nanometers for Shifted Excitation Raman Difference Spectroscopy", Appl. Spectrosc. 69, 1144-1151 (2015)], can be used. This enables a particularly compact and robust realisation of the method according to the invention presented here. Further, it is also preferred that the excitation source is a correspondingly narrow-band diode laser that is spectrally adjustable over a broad range. This can for example be an ECDL system or a spectrally adjustable diode-pumped solid body laser. Furthermore, for example, correspondingly adjustable dye or fibre lasers or the individual teeth of an optical frequency comb are suitable.

Preferably, passive filter elements are narrow-band band pass filters, whereby a filter wavelength is determined by the central wavelength of such a band pass. These can in particular be dichroitic filters, Bragg filters or Fabry-Perot filters. Here, passive means that no active change in the filter properties of the filter element is made in order to record a Raman spectrum, in particular, however, that the respective filter wavelengths of a filter element are time invariant. Narrow band means that the spectral width of the band pass relates to a limited spectral range. Particularly preferred pass band widths (FWHM) here lie below 10 nm, below 5 nm, below 1 nm and below 0.1 nm. Depending on the wavelength range, this corresponds to frequency widths in the lower THz range down to the MHz range. As already explained, a single filter element can also have multiple pass bands with different filter wavelengths. Thus, a narrow-band band pass filter should be regarded as being a filter element that essentially has a high transmission for incoming radiation with an identical wavelength, while suppressing a transmission, however, for radiation in a range directly adjacent to the respective filter wavelength. Here, "directly" is defined via the filter band width of the respective pass band. It is particularly preferred here that the entirety of all stop bands occurring (spectrally connected blocking area of a filter element) extends overall at least over an area which is given by the spectral width of the Raman excitation, i.e. by the maximum spectral distance between the excitation wavelengths used according to the method according to the invention presented here.

The detectors are single-channel detectors. These can be designed both as individual single-channel detectors or as individually readable multiple-channel detectors as with single-channel detectors. This has the advantage that here, particularly low-cost, compact, and robust detector facilities can be used. The use of a high-resolution, low-noise and sensitive CCD camera is not required. If multiple-channel detectors are operated via single channels as individual single-channel detectors, several channels can also be combined to create a single-channel detector. Independent reading of the single channel bundle should be possible.

The Raman spectroscopy method according to the invention permits the recording of Raman spectra using low-cost components and is suitable for the construction of particularly small, compact and robust spectroscopy arrangements. In particular, through the selection of corresponding components, an adaptation of the method to different preferred application cases can be achieved. In particular, when excitation radiation is used which extends continuously over a wide spectral range, through the selection of corresponding filter elements, the continuous Raman spectrum of a sample can be recorded over a correspondingly broad spectral range, which is comparable with classic spectrometer arrangements for Raman spectroscopy. This method, which is known as TERS (Tunable Excitable Raman Spectroscopy) is therefore particularly suitable for the construction of the most robust, low-cost Raman spectroscopy system possible.

A further application example is the use in a low-cost and compact system for examining the presence of certain target substances in the samples, such as the detection of certain hazardous substances with an already known Raman spectrum. Here, the purpose is not usually the recording of a complete Raman spectrum over a broad spectral range, but in most cases, the examination of a single Raman line for identifying a certain target substance in a suspicious sample is sufficient. In particular, here, already through the radiation of just two different excitation radiations with two different excitation wavelengths, conclusions can already be drawn about a sample. In particular, if the spectral distance between the first excitation radiation and the scattered excitation radiation which is filtered by a corresponding filter element corresponds precisely to one Raman displacement of the excitation radiation scattered by the sample, a conclusion can be drawn regarding the presence of a corresponding sample. Here, it is particularly preferred when the second excitation radiation is a radiation the excitation wavelength of which also meets this condition for a further Raman displacement of this sample. Further, it is preferred that this is precisely not the case, i.e. the second excitation wavelength precisely does not correspond to a Raman displacement of the sample. This method, known as DORAS (Differential Optical Raman Spectroscopy) is therefore particularly suitable for the reliable, targeted determination of anticipated samples. Alongside the use of different excitation sources or excitation wavelengths of one or more excitation sources, this method can also be extended to the simultaneous examination of multiple substances through the use of multiple different filter elements or of one or more filter elements with different filter wavelengths in different filter ranges. Here, in particular, discreet, non-continuously adjustable excitation sources can be used to generate excitation radiation with discreet excitation wavelengths.

One option for improving detection reliability and precision of the method presented here is the additional comparison of such a Raman spectrum obtained according to the invention with a reference spectrum. This reference spectrum can here comprise the general measurement background (background spectrum) without excitation of the sample, i.e. without radiating excitation radiation. A comparison with a pure fluorescence spectrum of the sample or an alternative spectrum obtained from another sample is also possible. In particular, this permits the separation of the measurement background or other interfering measurement artefacts. Said reference spectrum can preferably also be a Raman spectrum of an anticipated sample that is obtained in a manner according to the invention or in any other manner. Here, through the comparison between the Raman spectrum determined according to the invention with an unknown sample and the provided reference spectrum with a known sample, an examination can be made of the correlation of certain features of the Raman spectrum of said samples. A comparison can in particular be made through an evaluation means designed to draw conclusions about the sample through comparison of the Raman spectrum obtained from the determination of at least two intensities with a reference spectrum. In particular, conclusions can be drawn about the sample in the method according to the invention through such a comparison. A Raman spectroscopy device according to the invention here has the following: at least one excitation source, designed to irradiate excitation radiation onto a sample to be examined, and to radiate the sample with at least one first excitation radiation of a first excitation wavelength and a second excitation radiation of a first excitation wavelength, whereby at least the first excitation wavelength differs from the second excitation wavelength; a passive filter element designed to wavelength-selectively filter at least the first excitation radiation scattered by the sample and the second excitation radiation scattered by the sample, whereby a filter wavelength of the passive filter element differs from at least the first excitation wavelength and the second excitation wavelength; a single-channel detector assigned to the passive filter element, designed to determine at least one first intensity of the first excitation radiation scattered by the sample and filtered and a second intensity of the second excitation radiation scattered by the sample and filtered; and a means for evaluation, designed to draw conclusions about the Raman spectrum of the sample from the at least two intensities determined by the single-channel detector.

Therefore, the Raman spectroscopy device according to the invention preferably has all those features that are required for the realisation of the individual method steps of the method described above. In particular, the individual components of the Raman spectroscopy device according to the invention have all those features stated as being necessary or preferred in the above description of the method. Furthermore, individual embodiments or a combination of features of individual embodiments of the method according to the invention also lead to corresponding embodiments of the device according to the invention. The information provided in relation to the individual embodiments of the method according to the invention applies accordingly.

BRIEF DESCRIPTION OF THE FIGURES

The invention will now be explained through exemplary embodiments with reference to the related drawings, in which.

DETAILED DESCRIPTION OF THE INVENTION

Figure 1:
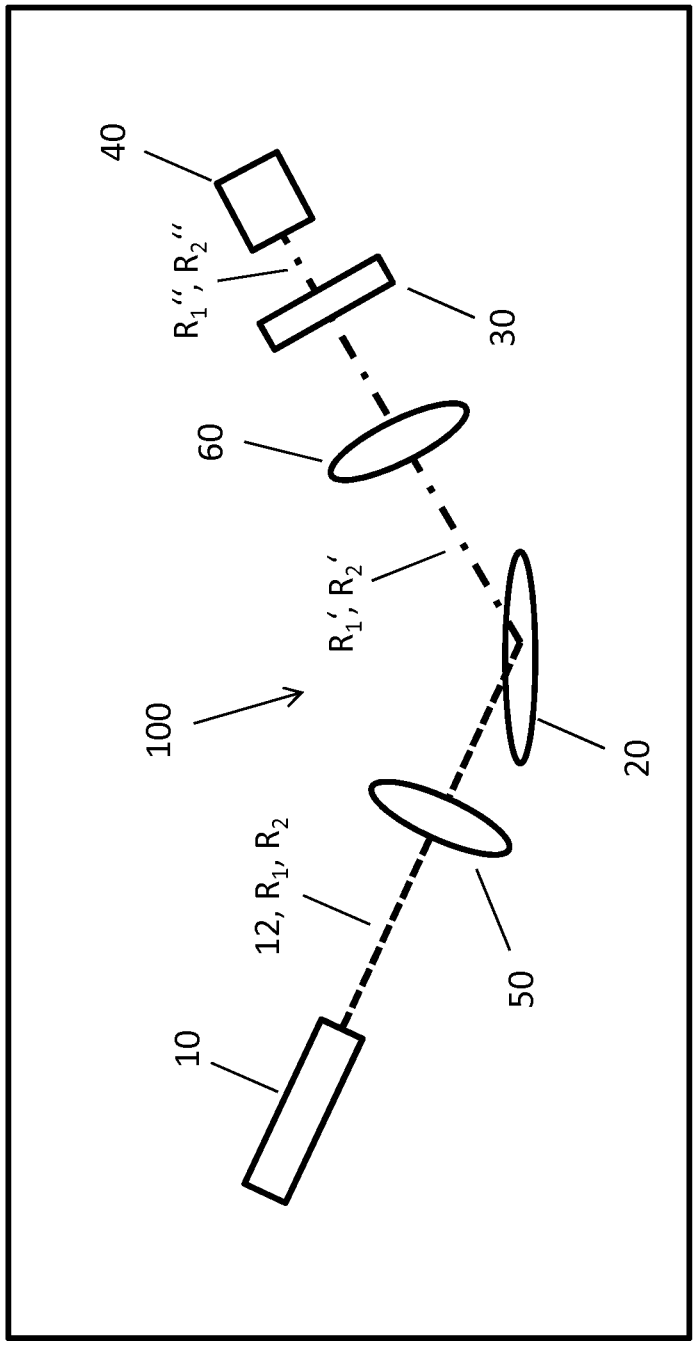
FIG. 1 shows a schematic view of a Raman spectroscopy device according to the invention.

FIG. 1 shows a schematic view of a Raman spectroscopy device 100 according to the invention. Using a first coupling means 50, the excitation radiation 12 emitted from the excitation source 10 is coupled into the sample 20 to be examined. The excitation source 10 can preferably be a narrow band laser diode that is continuously spectrally adjustable over a broad range and that is directly modulated. This can particularly be a plurality of excitation radiations $R_n$ with $n \to \infty$ with different excitation wavelengths $\lambda_n$ from the accessible spectral range of the laser emission of the laser diodes. Laser diodes with a laser wavelength that is spectrally continuously adjustable without mode volatility are particularly preferred here. The different excitation wavelengths $\lambda_n$ are therefore coupled into the sample one after the other with a time differential-incremental offset while the laser is being adjusted. The excitation radiation $R_n'$ which is inelastically scattered by the sample 20 is then coupled into a detector 40 by a second coupling means 60 after spectral filtering through a passive filter element 30 with a filter wavelength that deviates from the possible excitation wavelengths $\lambda_n$. The first coupling means 50 and the second coupling means 60 are preferably image optics, such as individual lenses, lens systems or lenses used for coupling radiation in and out into or from the sample 20. The passive filter element 30 can in particular be a narrow-band band pass filter, whereby the filter wavelength $\lambda_F$ is determined by the central wavelength of the band pass. The detector 40 can in particular be a single-channel detector. The excitation radiation $R_n'$ scattered by the sample 20 is filtered through the filter element 30 in accordance with its filter properties. One intensity $I_n$ in each case is determined by the detector 40 after passing the filter element 30 from the scattered and filtered excitation radiation $R_n''$. In the case of the embodiment described here, a complete Raman spectrum of the sample 20 emerges from the connection between the individual determined intensities $I_n$, the time progression of the coupled excitation wavelengths $\lambda_n$ and the filter wavelength $\lambda_F$ of the filter element 30, which in particular results from the determined intensities $I_n$ with the individual spectral distances between the filter wavelength $\lambda_F$ of the filter element 30 and the individual excitation wavelengths $\lambda_n$.

Figure 2A:
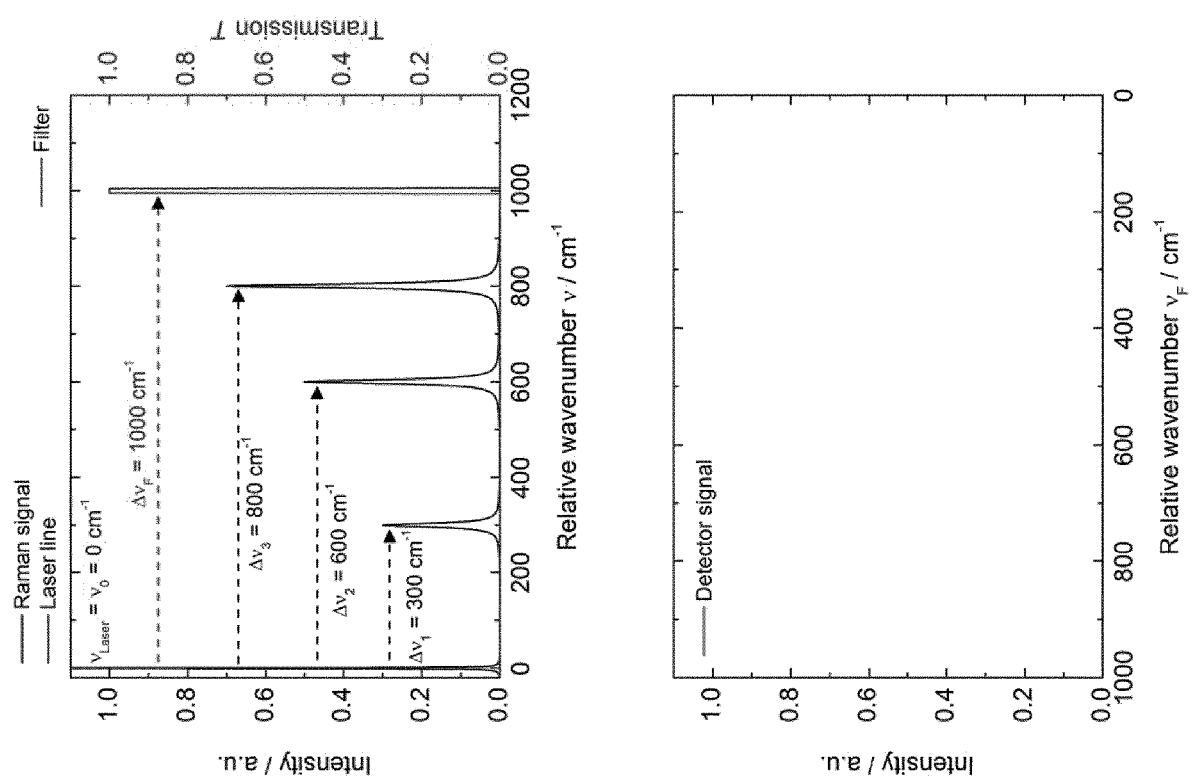
FIGS. 2a-2d show the time progression of the recording of a Raman spectrum with a Raman spectroscopy device according to the invention as shown in FIG. 1.

FIGS. 2a to 2d show the time progression of the recording of a Raman spectrum with a Raman spectroscopy device 100 according to the invention as shown in FIG. 1. The reference numerals listed here apply accordingly. In the diagrams shown, the relations between the individual wavelengths and the associated progression of the intensity values $I_n$ determined by the detector 40 assigned to the filter wavelength $\lambda_F$ are shown. In this regard, the relative wavelength in relation to a specific reference wavelength $\lambda_B$, which is equated below without loss of generality with the first excitation wavelength $\lambda_1$, is drawn in on the respective X-axes of the individual diagrams. In FIG. 2a, the typical spectral progression of a first excitation radiation $R_1$ of a first excitation wavelength $\lambda_1$ with a relative wave number of von 0 cm$^{-1}$ is therefore shown as an example in the upper diagram. The excitation radiation $R_1$ is coupled into the sample 20 and inelastically scattered by the sample. The Raman lines which are here only assumed as an example are with relative wave numbers of 300 cm$^{-1}$, 600 cm$^{-1}$ and 800 cm$^{-1}$, i.e. at a fixed spectral distance from the excitation wavelengths $\lambda_n$. In relation to the excitation radiation, a broadening of the individual Raman profiles can typically be observed here. The pass band range of the filter element 30 used is here also included as an example. Through the selection of a corresponding filter wavelength $\lambda_F$, this has a fixed spectral distance in relation to the reference wavelength $\lambda_B$, i.e. to the first excitation wavelength $\lambda_1$, with a wave number of 1000 cm$^{-1}$. Here, a narrow-band band pass is shown as an example, which has a relative transmission of 1.0 around the relative wave number of 1000 cm$^{-1}$ and which is otherwise fully non-transparent throughout for the incoming scattered excitation radiation $R_1'$. The lower diagram shows the intensity values $I_n$ determined by the detector 40 for an excitation radiation $R_n$ of a determined excitation wavelength $\lambda_n$ following spectral filtering through the filter element 30. The representation in this diagram is cumulative, so that all intensity values $I_n$ determined in the time progression of the individual FIGS. 2a to 2d of all previous excitation radiations $R_n$ are included and remain. This corresponds in principle to a storage of the individual intensity values $I_n$ according to the invention.

It can be seen in FIG. 2a that none of the Raman lines of the sample that occur during coupling in of the first excitation radiation $R_1$ with the first excitation wavelength $\lambda_1$ falls spectrally into the pass band window of the filter element 30 with the filter wavelength $\lambda_F$. For this reason, no transmission occurs of the first excitation radiation $R_1'$ scattered by the sample 20, so that the detector 40 measures no intensity as the first intensity $I_1$. For this reason, no curve progression can be seen in the lower diagram.

Figure 2B:
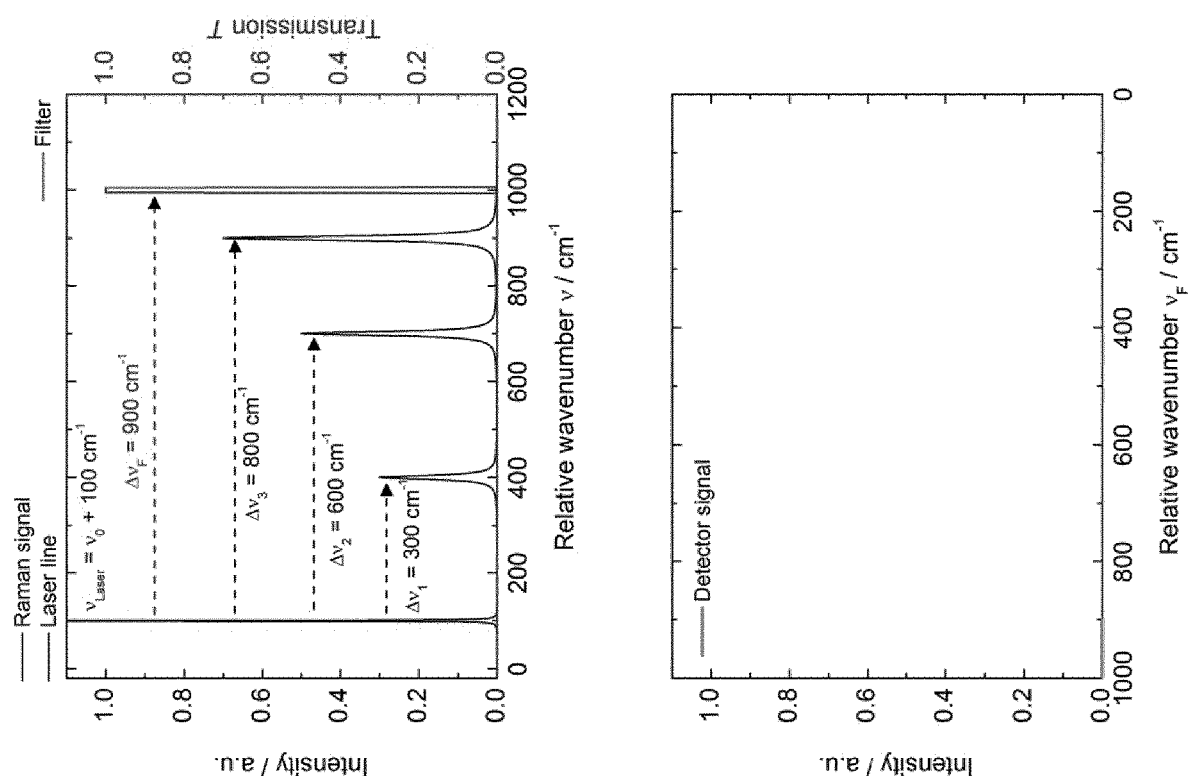

By contrast, FIG. 2b shows the case in which a second excitation radiation $R_2$ of a second excitation wavelength $\lambda_2$ is radiated, whereby the second excitation wavelength $\lambda_2$ differs from the first excitation wavelength $\lambda_1$ and thus from the reference wavelength $\lambda_B$. Here, the spectral distance lies between the first excitation wavelength $\lambda_1$ and the second excitation wavelength $\lambda_2$ with a relative wave number of 100 cm$^{-1}$. This displacement of the excitation wavelength initially changes nothing of the ratios shown in FIG. 2a with regard to the pass band range of the filter element 30, so that in the case shown, a diminishing second intensity $I_2$ is also determined on the detector 40. The change from the first excitation radiation $R_1$ to the second excitation radiation $R_2$ can be achieved through a discreet transfer. In order to record a continuous spectrum, the excitation radiation $R_n$ can however also be adjusted continuously from the first excitation wavelength $\lambda_1$ to the second excitation wavelength $\lambda_2$. In such a case, as many further excitation radiations $R_I$ as required with their respective excitation wavelengths $\lambda_I$ lie between the first excitation wavelength $\lambda_1$ and the second excitation wavelength $\lambda_2$. For the purpose of simplifying the description, only the excitation radiations $R_n$ are counted that are particularly labelled in the individual figures. However, it can be seen in the diagram shown below in FIG. 2b that here, a plurality of intensity values $I_I$ must already have been determined with different excitation radiations $R_I$.

Figure 2C:
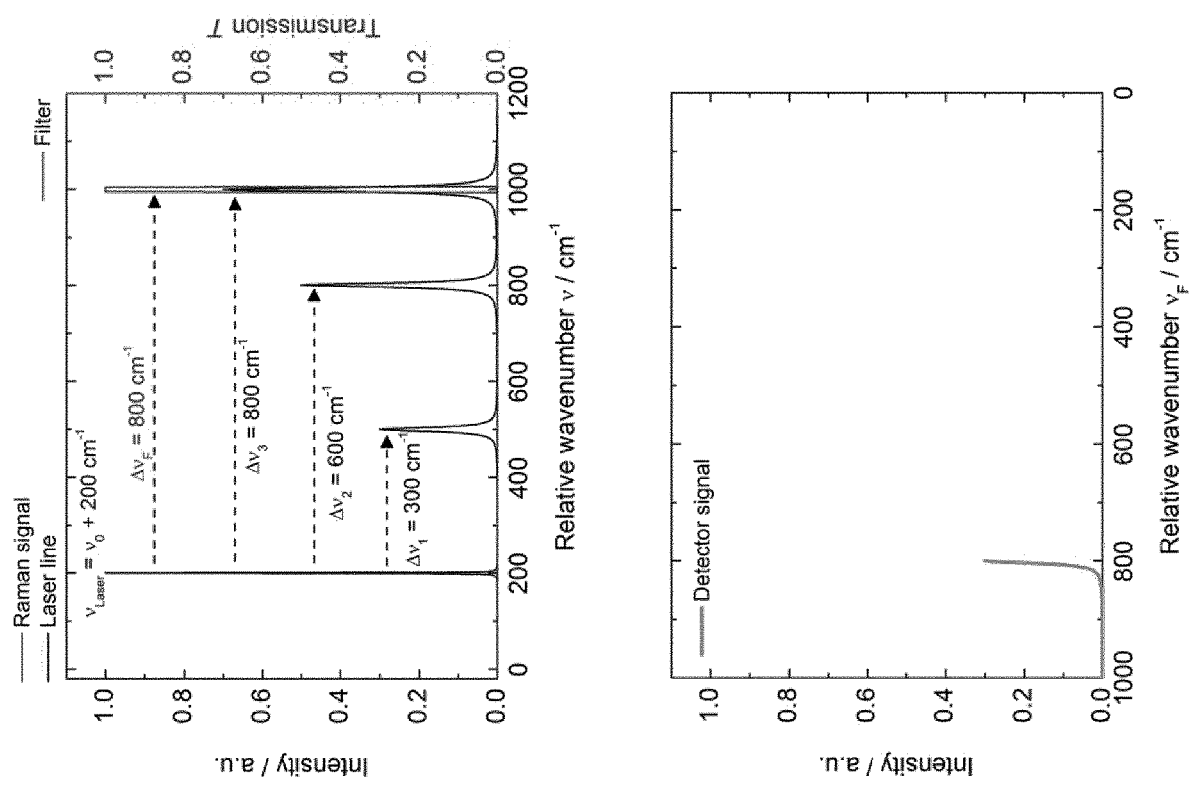

FIG. 2c shows the case that through a further spectral adjustment of the emission of the excitation source 10, a third excitation radiation of a third excitation wavelength $\lambda_3$, which here has a spectral distance to the first excitation wavelength $\lambda_1$, i.e. to the reference wavelength $\lambda_B$ of 200 cm$^{-1}$, is radiated, whereby the resulting Raman line with a relative wave number 800 cm$^{-1}$ of falls precisely into the pass band range of the filter element 30. As a result, the detector 40 can determine a corresponding third intensity $I_3$ according to the intensity of this Raman line. This can be added to the already stored intensity progression of all previously determined intensities. As can be seen in the lower diagram, as a result, the individual Raman lines of a sample can be spectrally moved one after the other over the pass band range of the filter element 30 with a continuous adjustment of the excitation radiation 12, so that with the aid of the detector 40, a continuous Raman spectrum in the accessible spectral range can be recorded.

Figure 2D:
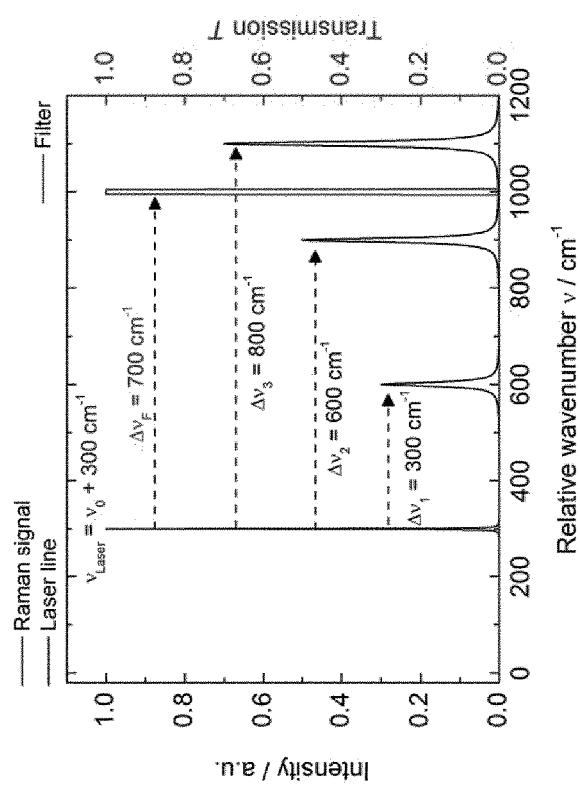
Figure 2D:
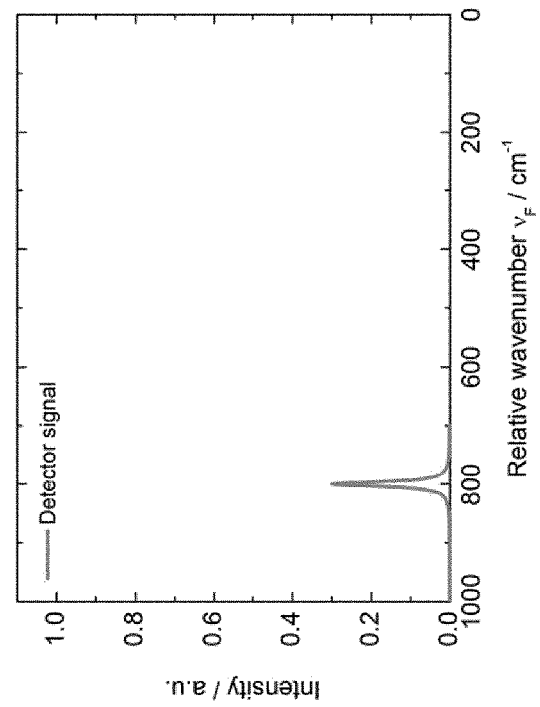

FIG. 2d finally shows the case that through further spectral adjustment of the emission of the excitation source 10, a fourth excitation radiation $R_4$ of a fourth excitation wavelength $\lambda_4$, which here has a spectral distance to the first excitation wavelength $\lambda_1$, i.e. to the reference wavelength $\lambda_B$, of 300 cm$^{-1}$, is radiated. The Raman line with the relative wave number of 800 cm$^{-1}$ has already been fully moved beyond the pass band range of the filter element 30 and is now spectrally in the right-hand blocking area of the filter element 30. The full progression of this Raman line with its precise spectral position can already be seen in the lower diagram.

Figure 3:
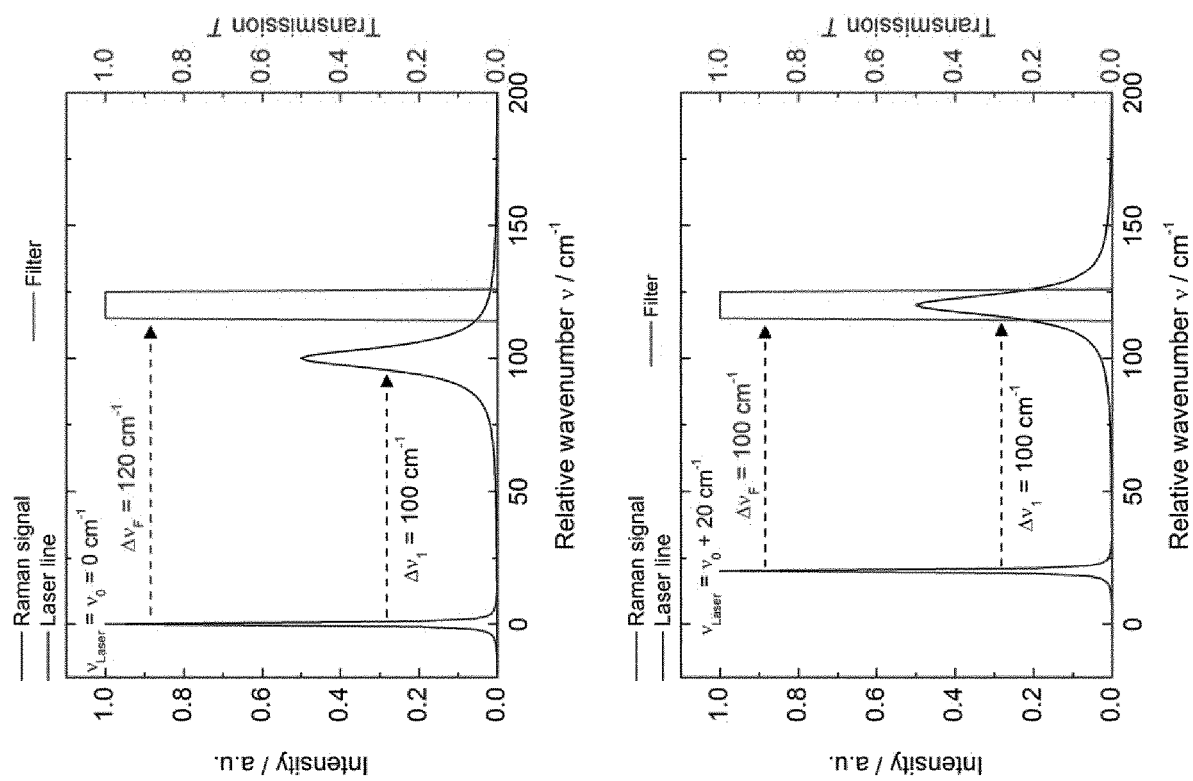
FIG. 3 shows a schematic drawing of the influence of the filter band width.

FIG. 3 shows a schematic drawing of the influence of the filter band width. The diagrams shown essentially correspond to the situations shown in FIGS. 2a to 2d, whereby here, only a single Raman line with a relative wave number of 100 cm$^{-1}$ is shown in spectral relation to the pass band range of a broad-band filter element 30. The upper diagram shows the Raman line of the sample 20 on the edge of the pass band range, while in the lower diagram, the Raman line falls precisely in line with the filter wavelength $\lambda_F$ of the pass band range. The form and width of the Raman lines determined according to the invention through the measurement of different intensity values here mathematically results from a folding of the individual Raman profiles with the specific filter function of the filter element 30. Further, the respective spectral profile of the excitation radiations $R_n$ used can also contribute to the form and width of the determined Raman lines. In the case shown here, the spectral band width of the pass band range of the filter element 30 is in particular of approximately the same size as line width of the Raman line shown. As can be seen in the two diagrams, due to the high band width of the filter element 30, an average value formation with the respectively determined intensity values occurs. This average value formation has a corresponding influence on the line width actually measured when determining a Raman profile. For this reason, for the most precise measurement possible of a Raman profile of a sample 20 determined according to the invention, particularly sharp line profiles are preferred with the different excitation radiations $R_n$ and the most narrow-band filter elements possible with sharp band edges (laser line band pass) are particularly preferred.

Figure 4:
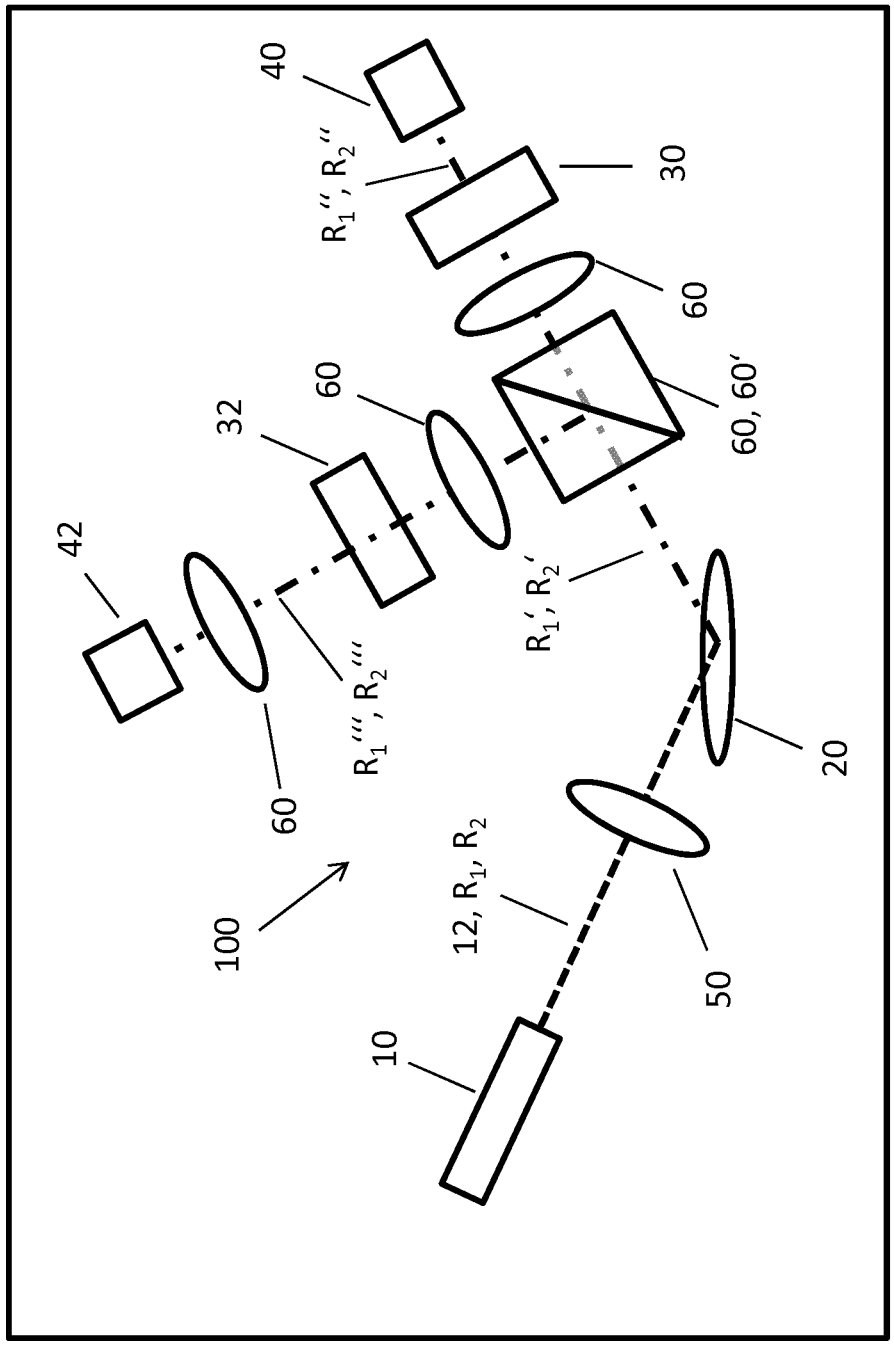
FIG. 4 shows a schematic drawing of a further Raman spectroscopy device according to the invention.

FIG. 4 shows a schematic drawing of a further Raman spectroscopy device 100 according to the invention. The principle structure of the device essentially corresponds to the embodiment shown in FIG. 1, with the difference that here, a filter element 30 and a further filter element 32 are present. Through these two filter elements, a wavelength-selective filtering occurs of at least the first excitation radiation $R_1'$ scattered by the sample 20 and the second excitation radiation $R_2'$ scattered by the sample 20, whereby the transmitted filter wavelengths $\lambda_F$, $\lambda_F'$ of the individual filter elements can differ both from each other and respectively from the individual excitation wavelengths $\lambda_1$, $\lambda_2$ of the respective excitation radiations $R_1$, $R_2$. Through a further detector 42 assigned to the further filter wavelength $\lambda_F'$ at least one first intensity $I_1'$ and one second intensity $I_2'$ are respectively determined from the excitation radiation $R_1'''$, $R_2'''$ scattered by the sample 20 and filtered. The first coupling means 50 are a corresponding imaging optics similar to FIG. 1 for coupling in the excitation radiation 12 onto the sample 20. The second coupling means 60 comprise a non-polarising beam splitter 60' which splits the excitation radiation $R_1'$, $R_2'$ scattered by the sample 20 for coupling onto two detectors 40 42. The second coupling means 60 can however also contain further imaging optics both for the coupling out of the excitation radiation $R_1'$, $R_2'$ scattered by the sample 20 and for the coupling into the respective detectors 40, 42. The coupling means are always the entirety of all individual components present which fulfil the purpose according to the invention of coupling into the sample 20 or into the at least one detector 40. Here, the purpose is not a coherent arrangement of the respective individual components of a coupling means. In the present exemplary embodiment, all individual components of a coupling means into the two detectors 40, 42 are therefore included, which are located between the sample 20 and both detectors 40, 42. With such an arrangement of individual components, the decisive factor is not the position of the filter elements 30, 32; these can, as shown in the beam path reflected by the beam splitter, be enclosed by the respective coupling means 60. Otherwise, from the drawing in FIG. 4, no limitation of the scope of the Raman spectroscopy device 100 according to the invention can be seen. Through the addition of further beam splitters, filter elements and detectors, the device shown can be extended in its scope as required. Arrangements are also included in this exemplary embodiment with which a splitting of the excitation radiation $R_1'$, $R_2'$ scattered by the sample 20 is not conducted by a beam splitter, but is achieved through any manner required. Here, for example, a corresponding spatial extension of the excitation radiation $R_1'$, $R_2'$ scattered by the sample 20 is possible, so that individual partial areas of the beam can be added to the different filter elements with their respective detectors. Here, arrangements are also included with which several different filter elements are arranged adjacent to each other or in matrix form within a single component. This also applies accordingly to the individual detectors which can also be present in line or matrix form within a shared component. Further, with a corresponding multi-channel single detector, such a multi-coloured filter element can also be firmly connected to a shared unit.

Figure 5:
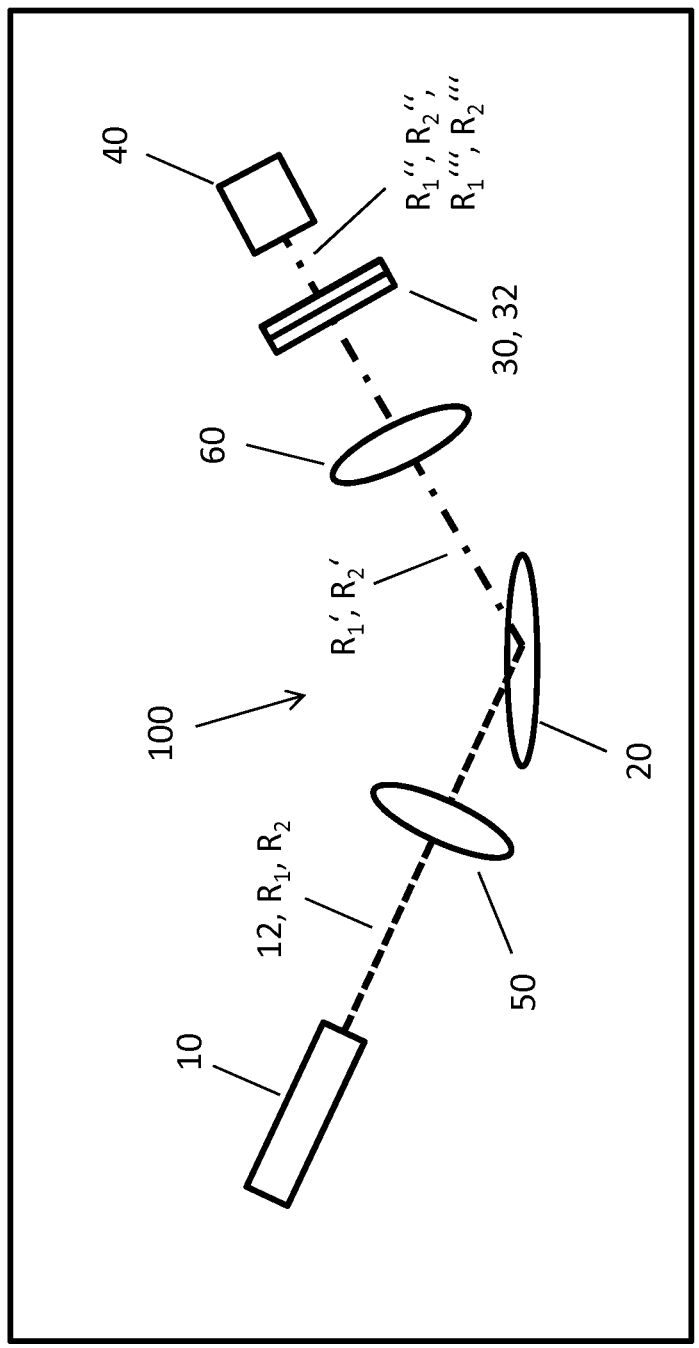
FIG. 5 shows a schematic drawing of a further Raman spectroscopy device according to the invention.

FIG. 5 shows a schematic drawing of a further Raman spectroscopy device 100 according to the invention. The fundamental structure of the device essentially corresponds to the embodiment shown in FIG. 1, with the difference that here, the filter element 30 has a filter wavelength $\lambda_F$ and a further filter wavelength $\lambda_F'$. This has the same meaning as an arrangement which consists of a filter element 30 and a filter wavelength $\lambda_F$ and a further filter element 32 with a further filter wavelength $\lambda_F'$, which are arranged one behind the other, and with which a filtering by both filter elements of the radiation falling onto the detector 40 occurs before a detection such that at least one pass band range of the first filter element 30 comprises the further filter wavelength $\lambda_F'$ of the further filter element 32. An additional extension to a plurality of further filter elements with further filter wavelengths or one filter element with a plurality of further filter wavelengths is also possible. In the present embodiment, the detector 40 is at the same time assigned to both the filter wavelength $\lambda_F$ and the further filter wavelength $\lambda_F'$. Here, conclusions about the sample 20 can be drawn through the respective ratios of the individual intensities.

Figure 6:
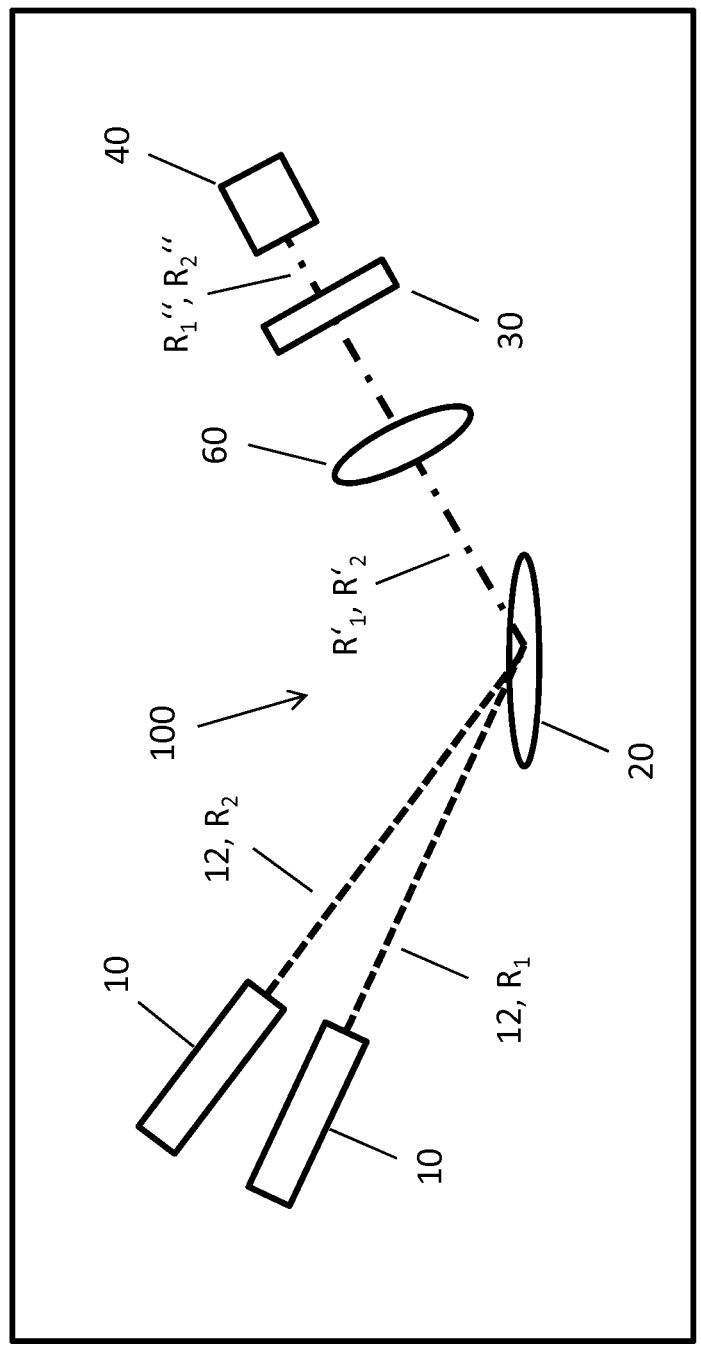
FIG. 6 shows a schematic drawing of a further Raman spectroscopy device according to the invention.

FIG. 6 shows a schematic drawing of a further Raman spectroscopy device 100 according to the invention. A first coupling means 50 has not been shown here; integration is optional. The fundamental structure of the device shown here essentially corresponds to the embodiment shown in FIG. 1, with the difference that two excitation sources 10 are present. Each of these excitation sources 10 can be designed to emit excitation radiation 12. In particular, these can be excitation sources 10 which can respectively generate and emit only one single excitation wavelength $R_1$ or $R_2$, or at least one of the excitation sources 10 can emit excitation radiation 12 of a plurality of excitation wavelengths. The number of excitation sources 10 can be extended as required. These can be freely combined with each other under the above conditions. Radiation of individual excitation radiations can be conducted at different times. Also possible are the simultaneous radiation of individual excitation radiations and a combination of these two radiation types. Here, the individual excitation radiations $R_n$ can be coupled into the sample at a shared excitation site or individual excitation sites can be provided for all or individual excitation radiations $R_n$ respectively. Otherwise, the information provided on the temporal and local manner of radiation applies, insofar as it is feasible, for all embodiments of the present invention cited.

Figure 7A:
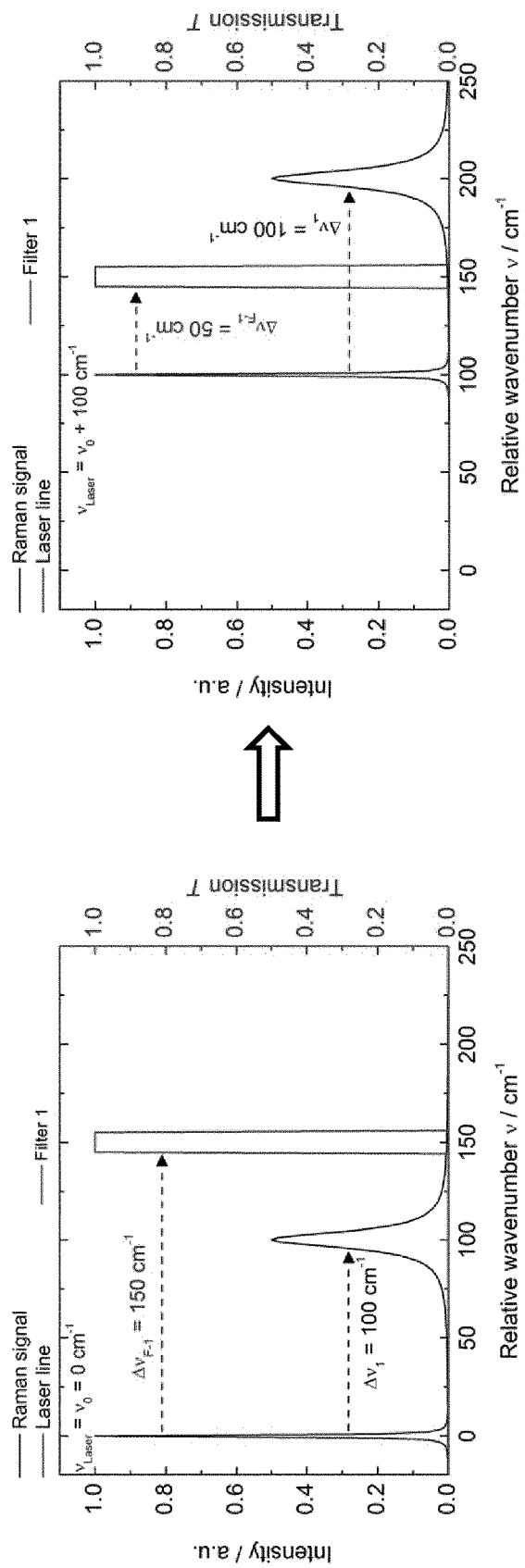
FIGS. 7a-7c show a general Raman difference spectroscopy scheme with a device according to the invention for recording a Raman spectrum.
Figure 7A:
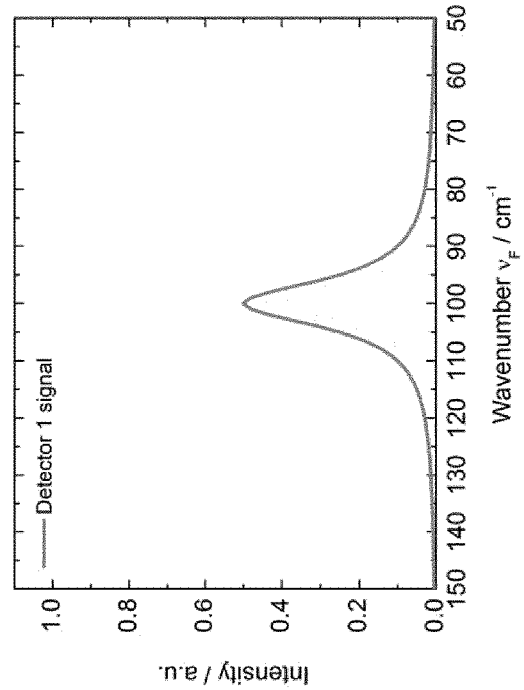
Figure 7B:
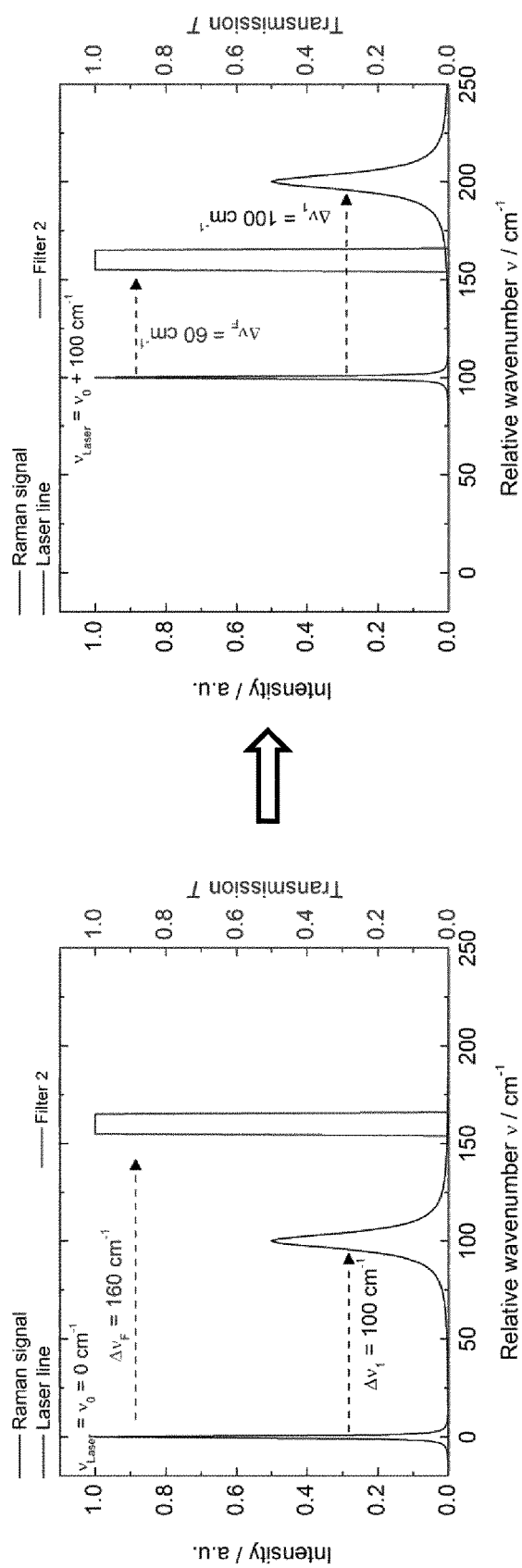
Figure 7B:
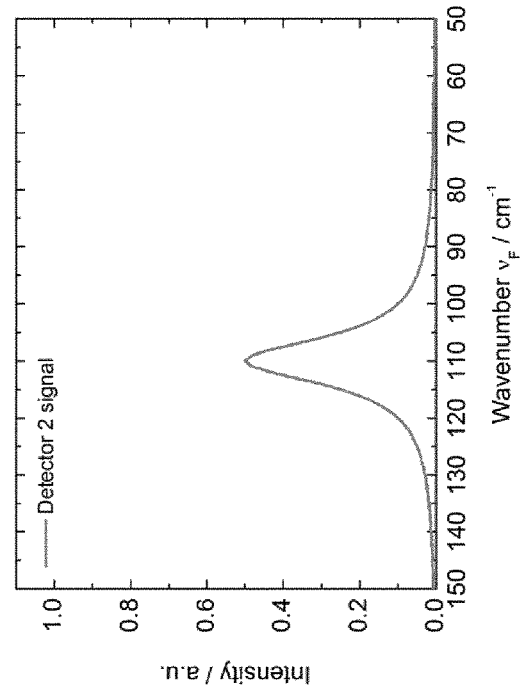
Figure 7C:
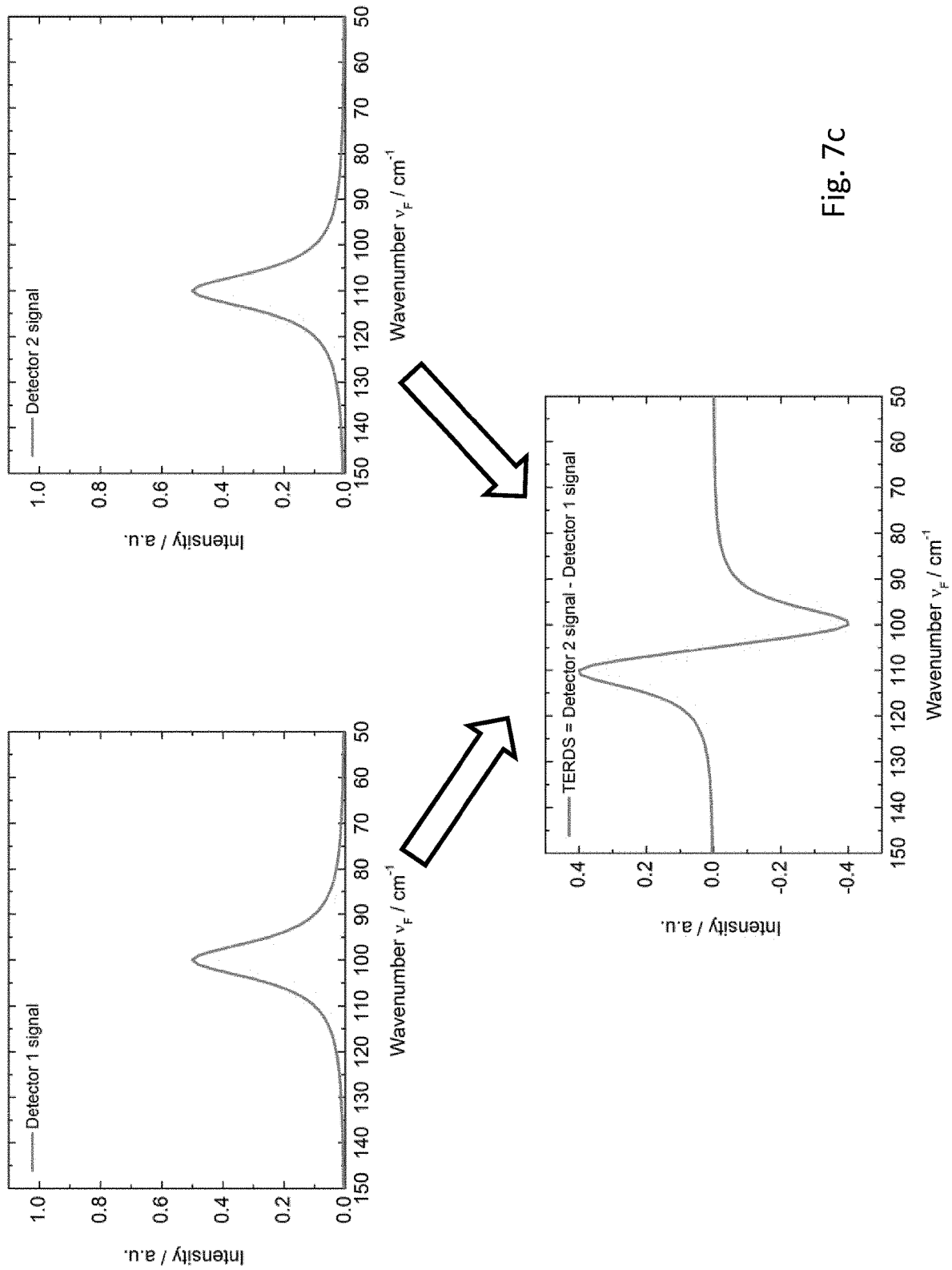

FIGS. 7a to 7c show a general Raman difference spectroscopy scheme with a Raman spectroscopy device 100 according to the invention. The diagrams shown in the individual figures here largely correspond to the diagrams shown in FIGS. 2a to 2d. All information in the description applies accordingly.

In a similar manner to FIGS. 2a and 2d, FIG. 7a shows the time progression of the recording of a Raman spectrum with a Raman spectroscopy device 100 according to the invention as shown in FIG. 1. In particular, the spectral intensity curve of a single Raman line of a sample is shown in the lower diagram, which has a relative wave number distance of 100 $cm^{-1}$ from the excitation radiation $R_1$ shown. The excitation radiation has been adjusted continuously over a spectral range of this size in order to record the spectrum. Here, the initial and end state of such a measurement can be seen in the two upper diagrams. The Raman line examined has been spectrally moved over the pass band range of the filter element 30. The relative wave number distance of the filter wavelength $\lambda_F$ in relation to the reference wavelength $\lambda_B$ is 150 $cm^{-1}$.

In a similar manner to FIG. 7a, FIG. 7b shows the result of such a measurement, whereby the filter wavelength $\lambda_F'$ of the filter element 30 used has a relative wave number of 160 $cm^{-1}$ in relation to the reference wavelength $\lambda_B$. Here, in direct comparison with the situation shown in FIG. 7a, it can in particular be observed that the transmitting filter areas around the filter wavelengths $\lambda_F$, $\lambda_F'$, of the respective filter elements 30 partially spectrally overlap and that apart from the filter wavelengths $\lambda_F$, $\lambda_F'$, the two filter elements 30 have identical transmission properties. As a result, the Raman spectra respectively recorded with one of the two filters essentially differ in their spectral position in relation to the spectral distance between the reference wavelength $\lambda_B$ and the respective filter wavelengths $\lambda_F$, $\lambda_F'$. The spectral position in FIG. 7b has thus been moved in relation to the corresponding drawing in FIG. 7a by one relative wave number of 10 $cm^{-1}$. Further deviations between the two spectra can also result from the respective measurement background and other measurement interferences.

FIG. 7c shows the two Raman spectra again as determined according to FIGS. 7a and 7b in direct comparison. Further, the difference spectrum resulting from the difference between these two spectra is shown below. The determination of such a difference spectrum makes it possible to draw more precise conclusions about the sample compared to the pure evaluation of recoded individual spectra. In particular, here, influences from the measurement background can be effectively filtered out through a separation of the background from the actual Raman signal. The method is based on a corresponding adaptation of what is known as SERD spectroscopy to the method according to the invention shown here (Shifted Excitation Raman Difference Spectroscopy, DE 10 2009 029 648 B3).

However, since a determination of the individual Raman spectra is achieved through the radiation according to the invention of a sample with excitation radiation with different excitation wavelengths, and not by means of a spectrometer, this method is named TERD spectroscopy (Tunable Excitation Raman Difference Spectroscopy) by way of distinction.

LIST OF REFERENCE NUMERALS

10 Excitation source
12 Excitation radiation
20 Sample
30 Filter element (at least with filter wavelength $\lambda_F$)
32 Further filter element (at least with filter wavelength $\lambda_F'$)
40 Detector (assigned to filter wavelength $\lambda_F$)
42 Further detector (assigned to filter wavelength $\lambda_F'$)
50 First coupling means
60 Second coupling means
60' Non-polarising beam splitter
100 Raman spectroscopy device
$\lambda_1$ First excitation wavelength
$\lambda_2$ Second excitation wavelength
$R_1$ First excitation radiation (first excitation wavelength $\lambda_1$)
$R_2$ Second excitation radiation (second excitation wavelength $\lambda_2$)
$R_1'$ Scattered first excitation radiation (first excitation wavelength $\lambda_1$)
$R_2'$ Scattered second excitation radiation (second excitation wavelength $\lambda_2$)
$\lambda_F$ Filter wavelength
$\lambda_F'$ Further filter wavelength
$R_1''$ Scattered and filtered first excitation radiation (filter wavelength $\lambda_F$)
$R_2''$ Scattered and filtered second excitation radiation (filter wavelength $\lambda_F$)
$R_1'''$ Scattered and filtered first excitation radiation (filter wavelength $\lambda_F'$)
$R_2'''$ Scattered and filtered second excitation radiation (filter wavelength $\lambda_F'$)
$I_1$ First intensity (filter wavelength $\lambda_F$)
$I_2$ Second intensity (filter wavelength $\lambda_F$)
$I_1'$ First intensity (filter wavelength $\lambda_F'$)
$I_2'$ Second intensity (filter wavelength $\lambda_F'$)

The invention claimed is:

1. A method for recording a Raman spectrum, comprising the following method steps:
   irradiating of excitation radiation onto a sample to be examined, whereby the sample to be examined is irradiated with a first excitation radiation of a first excitation wavelength and a second excitation radiation of a second excitation wavelength, whereby at least the first excitation wavelength differs from the second excitation wavelength,
   wavelength-selective filtering of the first excitation radiation scattered by the sample by a passive filter element, whereby a transmitted filter wavelength of the filter element differs from at least the first excitation wavelength and the second excitation wavelength, and whereby through a single-channel detector assigned to the filter wavelength from the first excitation radiation scattered and filtered by the sample, a first intensity is determined,
   wavelength-selective filtering of the second excitation radiation scattered by the sample by the filter element, whereby through the single-channel detector assigned to the filter wavelength from the second excitation radiation scattered and filtered by the sample, a second intensity is determined, whereby at least two determined intensities are stored,
   wavelength-selective filtering at least of the first excitation radiation scattered by the sample and the second excitation radiation scattered by the sample by at least one further passive filter element, whereby the transmitted filter wavelengths of the individual filter elements differ both from each other and also respectively from the individual excitation wavelengths of the respective excitation radiations, whereby through one each of the further single-channel detectors assigned to the at least one further filter wavelength, at least one first intensity and one second intensity are respectively determined from the excitation radiation scattered by the sample and filtered, whereby at least two determined intensities are stored for the at least one further filter wavelength, whereby from at least four determined intensities with at least two filter wavelengths, conclusions are drawn about the sample, and wherein the spectral distance between at least one excitation radiation and a scattered and filtered excitation radiation corresponds to precisely one Raman displacement of the excitation radiation scattered by the sample.

2. The method of claim 1, wherein the transmitted filter areas around the filter wavelengths of the respective filter elements spectrally overlap at least partially for at least two of these filter areas.

3. The method of claim 1, wherein the excitation radiation sources are narrow band, continuously spectrally adjustable over a wide range and directly frequency modulated laser diodes.

4. The method of claim 1, wherein the excitation radiation sources are dual wavelength diode lasers, in particular Y-branched dual wavelength DBR diode lasers.

5. The method of claim 1, wherein passive filter elements are narrow-band bandpass filters, whereby a filter wavelength is determined by the central wavelength of such a bandpass.

6. The method of claim 1, wherein the excitation radiation sources are dual wavelength diode lasers, in particular Y-branched dual wavelength DBR diode lasers.

7. A Raman spectroscopy device comprising:
at least one excitation source, designed to irradiate excitation radiation onto a sample to be examined, and to radiate the sample with at least one first excitation radiation of a first excitation wavelength and a second excitation radiation of a first excitation wavelength, whereby at least the first excitation wavelength differs from the second excitation wavelength, a passive filter element designed to wavelength-selectively filter at least the first excitation radiation scattered by the sample and the second excitation radiation scattered by the sample, whereby a filter wavelength of the passive filter element differs from at least the first excitation wavelength and the second excitation wavelength, a single-channel detector, assigned to the passive filter element, designed to determine at least one first intensity of the first excitation radiation scattered by the sample and filtered and a second intensity of the second excitation radiation scattered by the sample and filtered, whereby at least two determined intensities are stored, at least one further passive filter element, whereby the transmitted filter wavelengths of the individual filter elements differ both from each other and respectively from the individual excitation wavelengths of the respective excitation radiations; and one of the at least one further single-channel detectors assigned to the at least one further filter wavelength, designed to determine at least one first intensity and one second intensity respectively from the excitation radiation scattered by the sample and filtered, whereby the at least two intensities for the at least one further filter wavelength are stored, wherein a means for evaluation is designed to draw conclusions about the sample from at least four determined intensities with at least two filter wavelengths, wherein the spectral distance between at least one excitation radiation and a scattered and filtered excitation radiation corresponds to precisely one Raman displacement of the excitation radiation scattered by the sample.

8. The device according to claim 7, further comprising:
first means for coupling designed to couple the excitation radiation emitted from the excitation source into the sample to be examined, second means for coupling designed to couple the excitation radiation scattered by the sample into a single-channel detector, whereby the filter element is arranged such that the excitation radiation scattered by the sample passes the filter element before reaching the single-channel detector.

9. The device according to claim 7, wherein the excitation sources are spectrally adjustable and direct frequency-modulated laser diodes.

10. The device according to claim 7, wherein the excitation radiation sources are dual wavelength diode lasers, in particular Y-branched dual wavelength DBR diode lasers.

11. The device according to claim 7, wherein the transmitted filter areas around the filter wavelengths of the respective filter elements at least partially spectrally overlap for at least two of these filter areas.

* * * * *